(12) United States Patent
Dunkle et al.

(10) Patent No.: US 8,567,628 B2
(45) Date of Patent: Oct. 29, 2013

(54) FUEL CAP WITH FUEL-TANK PRESSURE/VACUUM DISSIPATION CONTROL SYSTEM

(75) Inventors: Gary L. Dunkle, Connersville, IN (US); Louis T. Frank, Connersville, IN (US)

(73) Assignee: Stant USA Corp., Connersville, IN (US)

( * ) Notice: Subject to any disclaimer, the term of this patent is extended or adjusted under 35 U.S.C. 154(b) by 1020 days.

(21) Appl. No.: 12/578,852

(22) Filed: Oct. 14, 2009

(65) Prior Publication Data

US 2010/0089919 A1 Apr. 15, 2010

Related U.S. Application Data

(60) Provisional application No. 61/105,338, filed on Oct. 14, 2008.

(51) Int. Cl.
*B65D 51/16* (2006.01)
*B65D 53/06* (2006.01)

(52) U.S. Cl.
USPC ............ 220/203.06; 220/203.01; 220/203.02; 220/203.07; 220/203.19; 220/203.22; 220/203.25; 220/228; 220/231; 220/303

(58) Field of Classification Search
USPC ............ 220/203.01, 203.06, 203.07, 203.19, 220/203.22, 203.25, 303, 228, 231, 220/DIG. 32, DIG. 33, 203.02
See application file for complete search history.

(56) References Cited

U.S. PATENT DOCUMENTS

| 4,036,399 | A | * | 7/1977 | Gerdes ........................ 220/303 |
| 4,498,493 | A | | 2/1985 | Harris |
| 4,676,390 | A | | 6/1987 | Harris |
| 4,779,755 | A | | 10/1988 | Harris |
| 4,787,529 | A | | 11/1988 | Harris |
| 4,887,733 | A | | 12/1989 | Harris |
| 5,108,001 | A | | 4/1992 | Harris |
| 5,183,173 | A | | 2/1993 | Heckman |
| 6,095,363 | A | | 8/2000 | Harris et al. |
| 6,481,592 | B2 | | 11/2002 | Harris |
| 6,739,472 | B2 | | 5/2004 | Newport |
| 7,131,469 | B2 | | 11/2006 | Dunkle |

* cited by examiner

*Primary Examiner* — Anthony Stashick
*Assistant Examiner* — Andrew T Kirsch
(74) *Attorney, Agent, or Firm* — Barnes & Thornburg LLP

(57) ABSTRACT

A fuel cap includes a filler-neck closure including a pressure-relief valve and a vacuum-relief valve and a handle arranged to overlie the filler-neck closure. The fuel cap also includes a torque-transmission ring arranged to lie between the handle and the filler-neck closure.

17 Claims, 9 Drawing Sheets

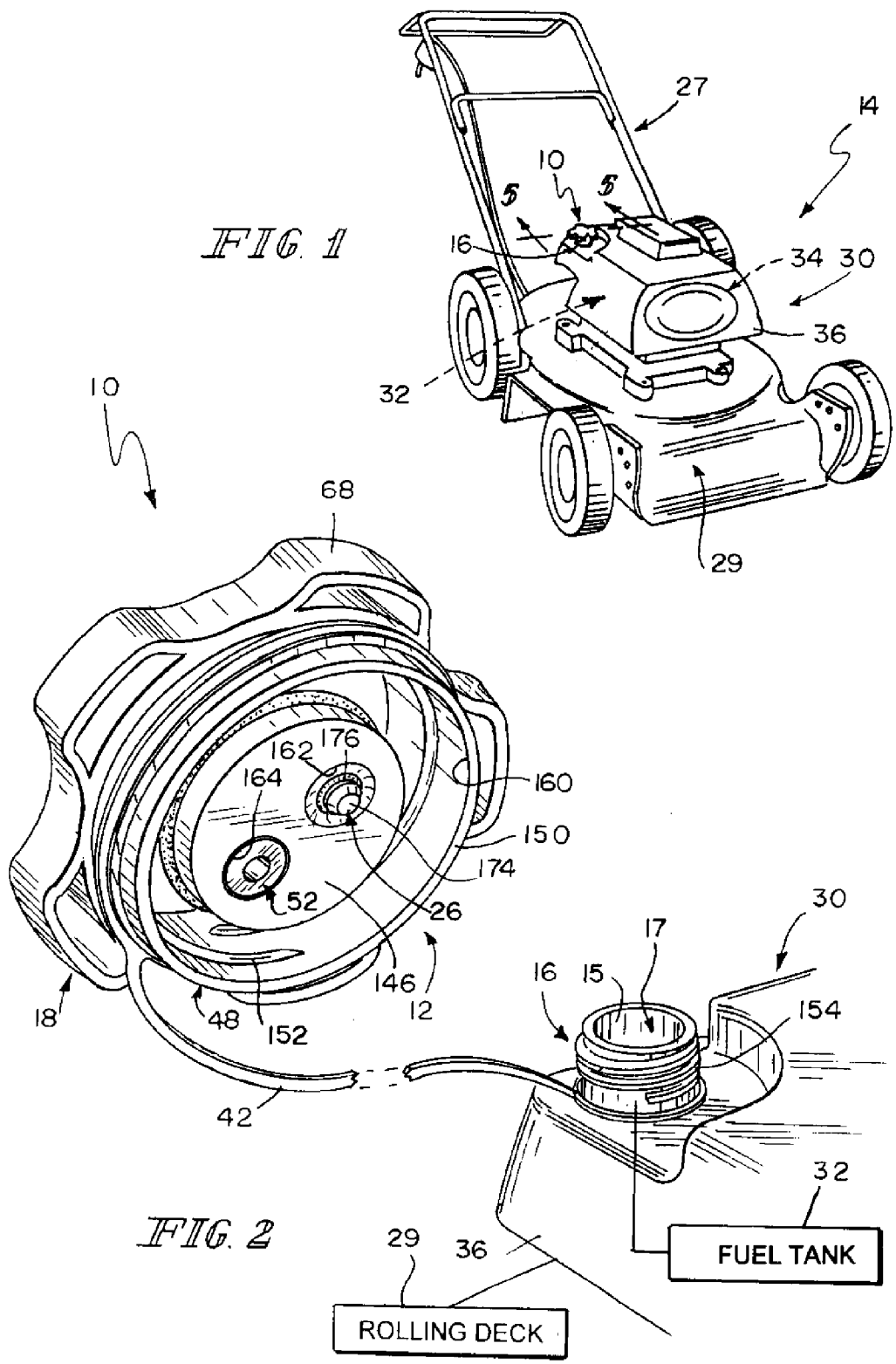

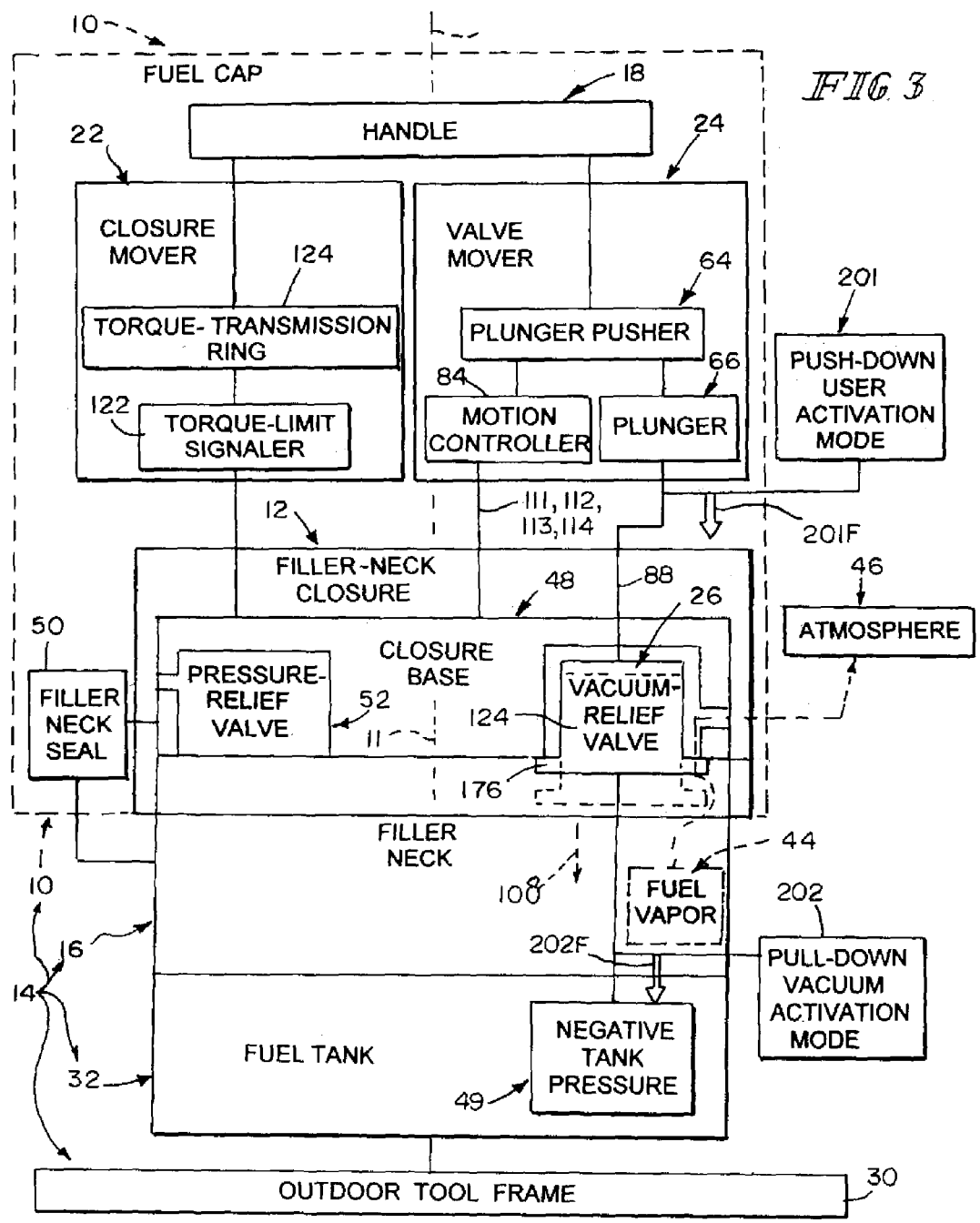

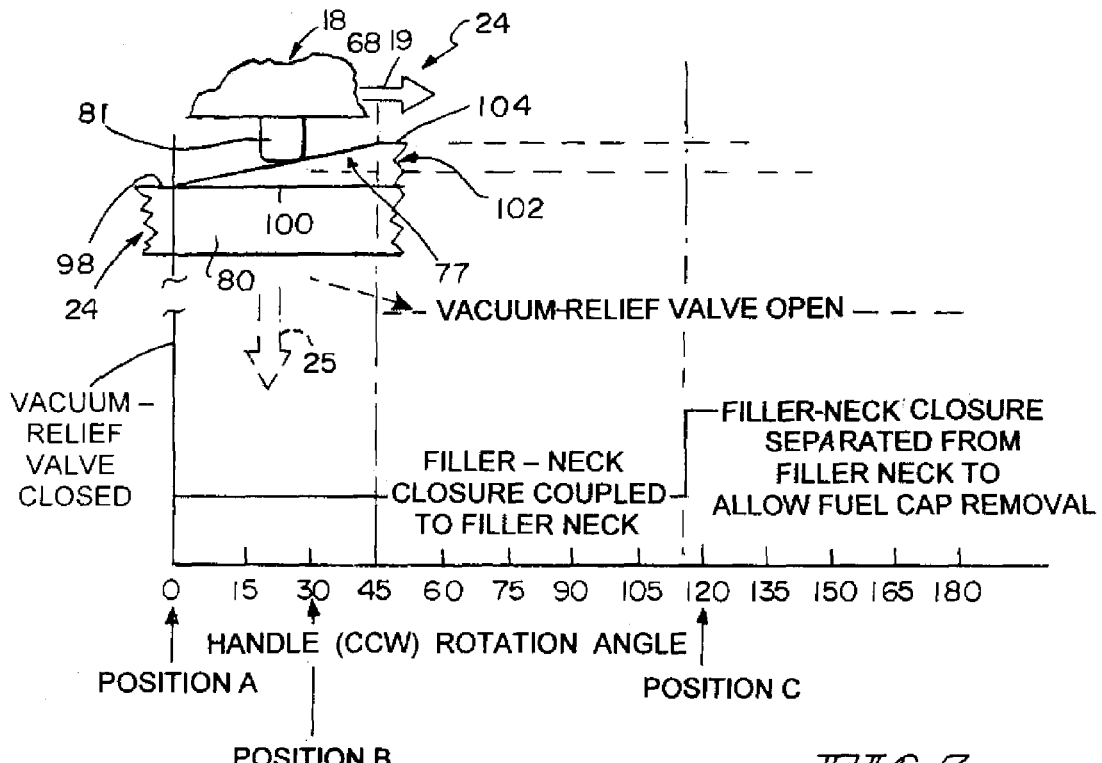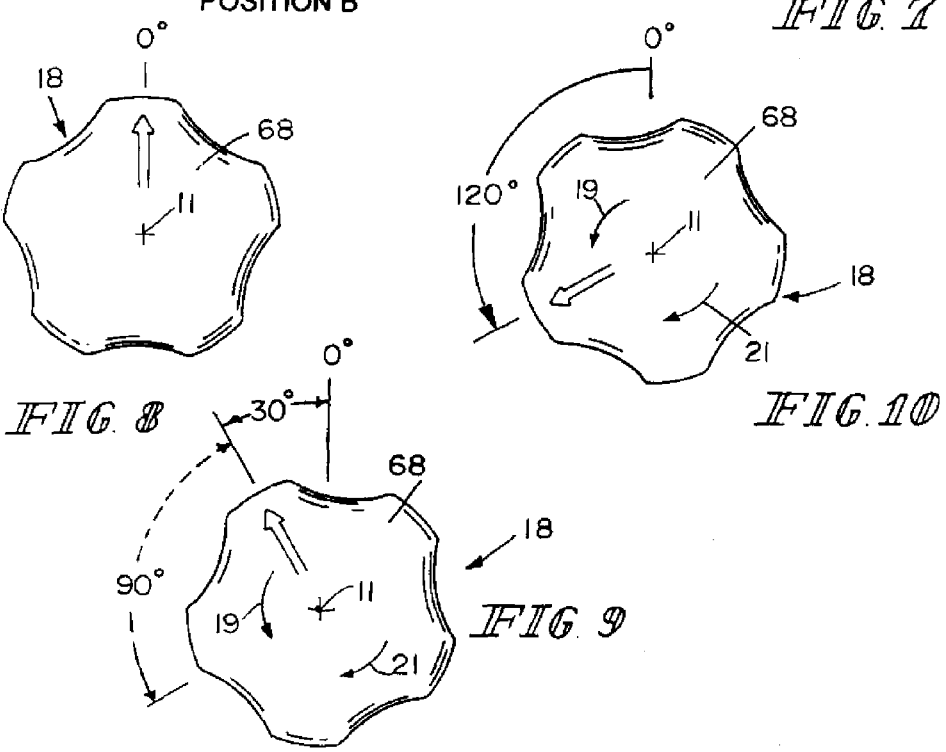

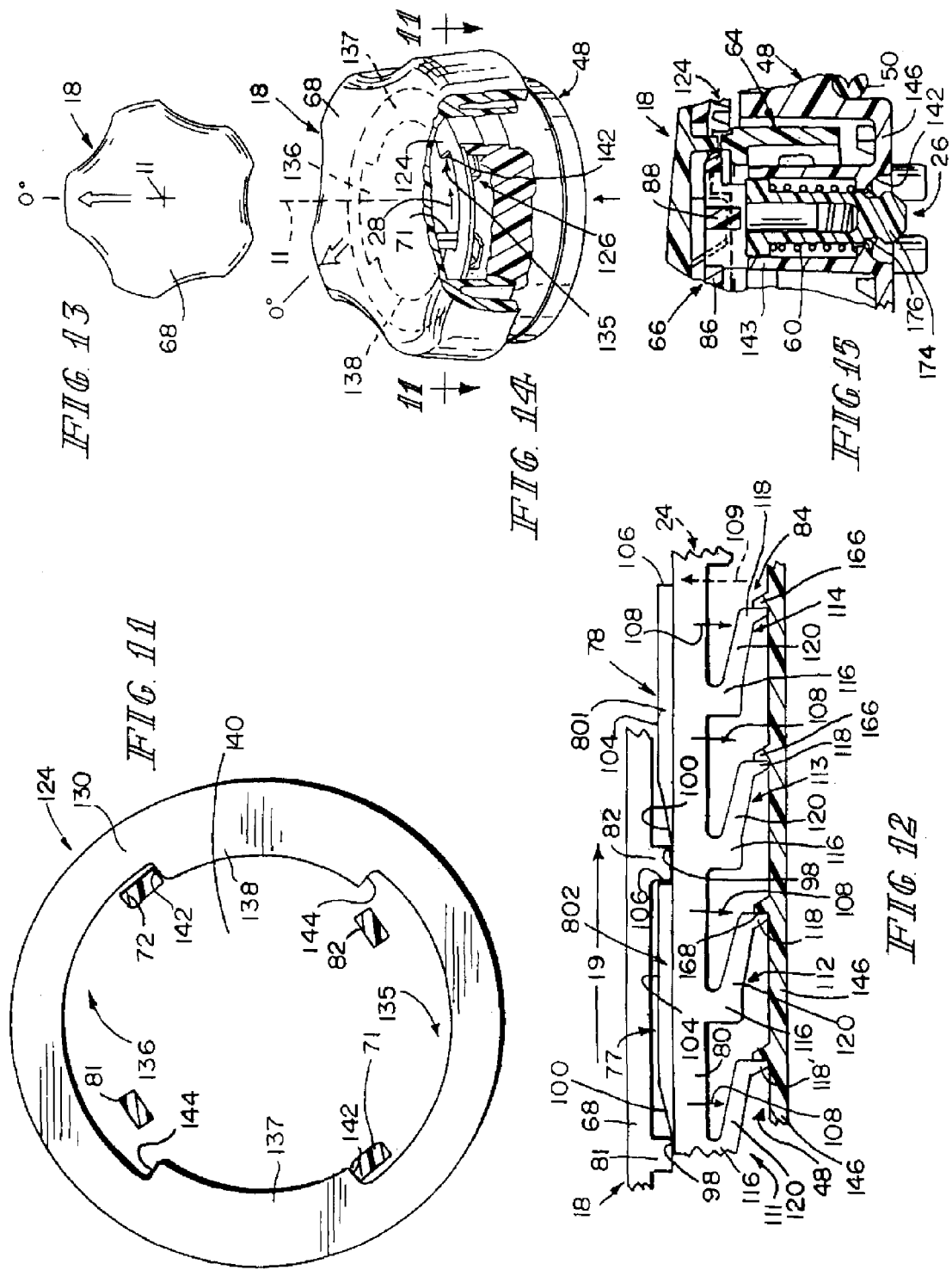

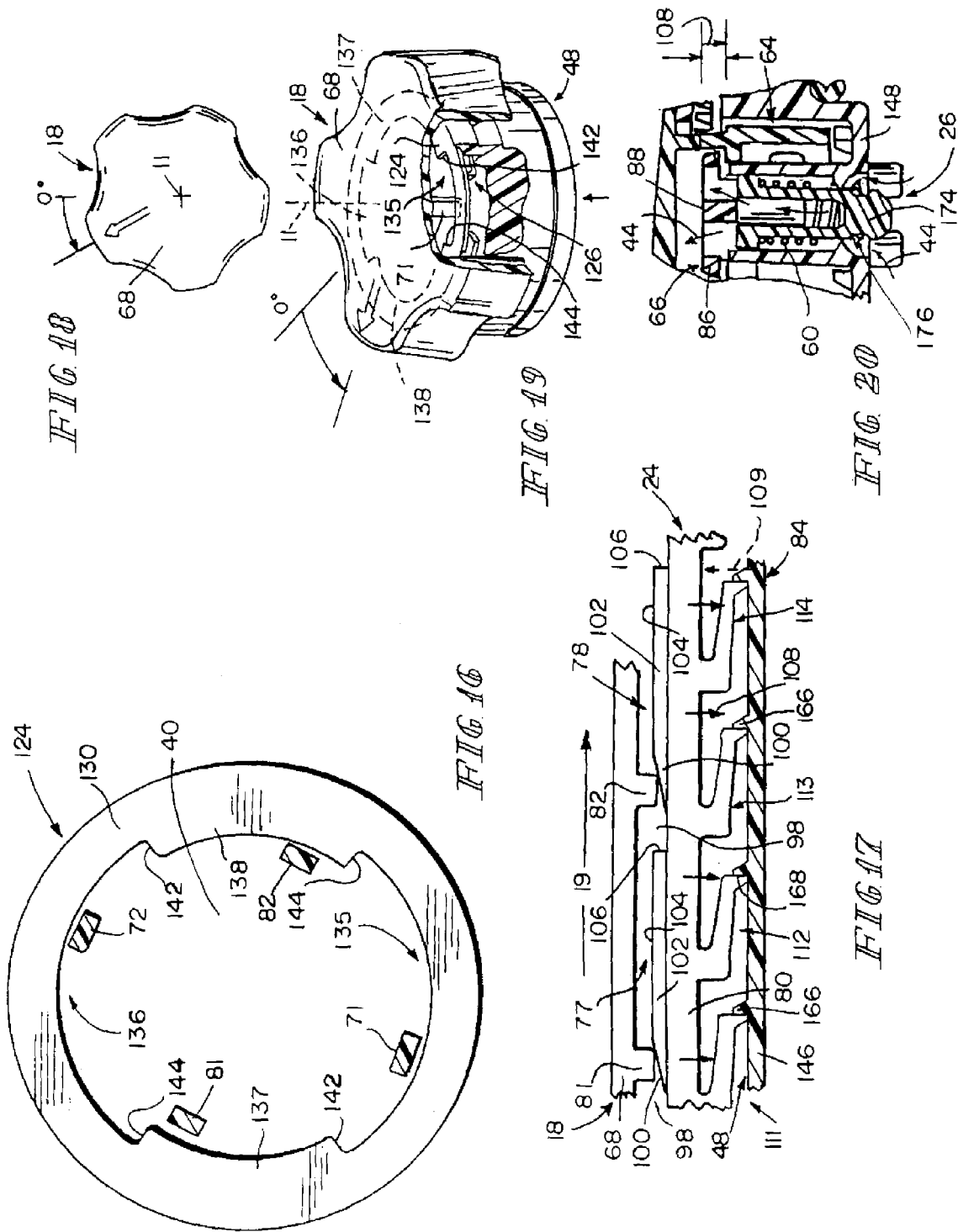

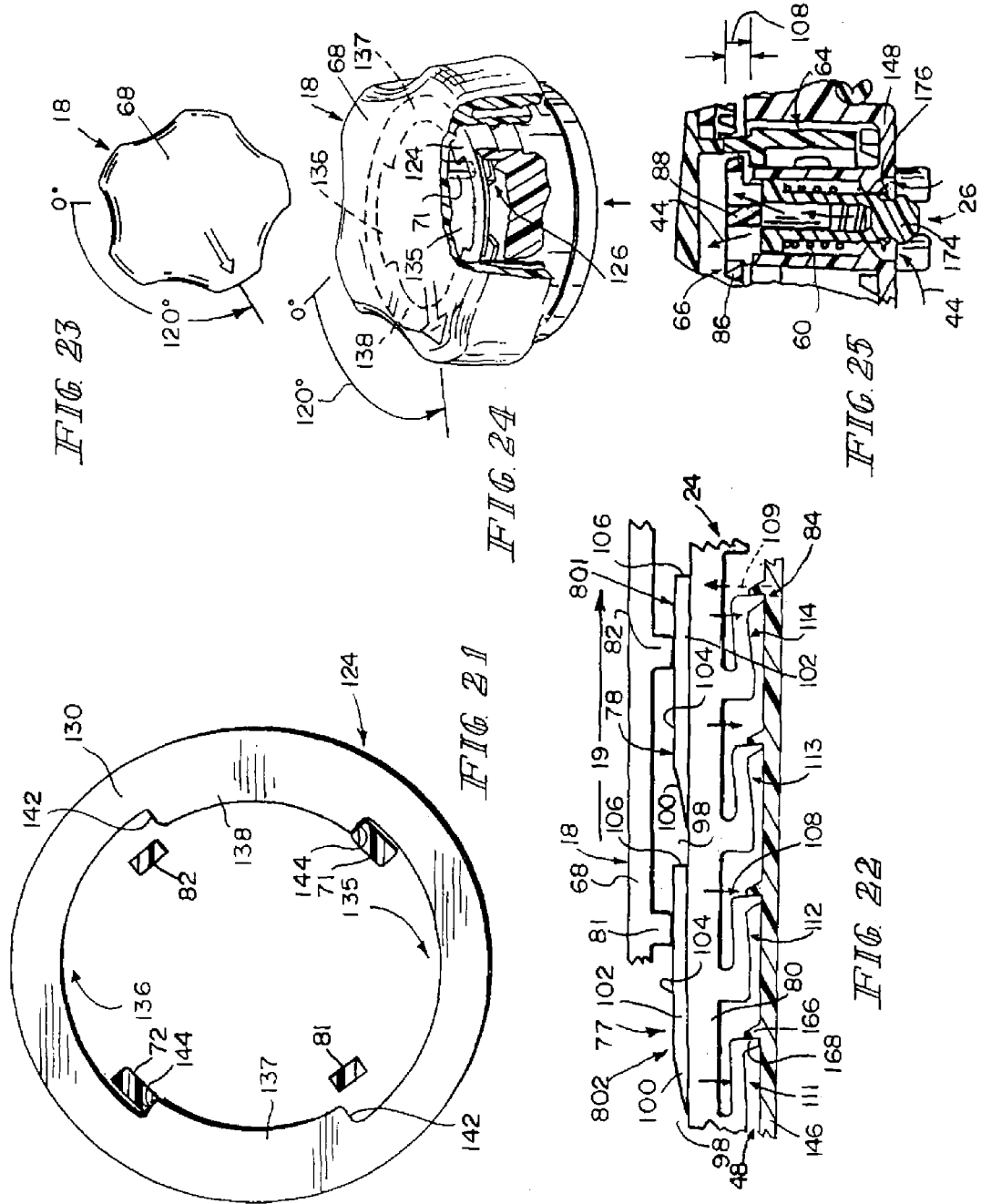

FUEL CAP WITH FUEL-TANK PRESSURE/VACUUM DISSIPATION CONTROL SYSTEM

This application claims priority under 35 U.S.C. §119(e) to U.S. Provisional Application Ser. No. 61/105,338, filed Oct. 14, 2008, which is expressly incorporated by reference herein.

BACKGROUND

The present disclosure relates to fuel caps, and particularly to fuel caps for outdoor tools such as lawn mowers. More particularly, the present disclosure relates to fuel caps including a fuel vapor venting apparatus.

SUMMARY

A fuel cap in accordance with the present disclosure includes a filler-neck closure adapted to move relative to a fuel tank filler neck and close a mouth opening into a fuel-conducting passageway formed in the filler neck, a handle adapted to be gripped by a user and rotated about a vertical axis of rotation relative to the filler tank fuel neck, and a closure mover. The closure mover is coupled to the handle and the filler-neck closure and configured to transmit torque applied to the handle to the filler-neck closure.

In illustrative embodiments, the filler-neck closure includes a closure base and a pressure-relief valve coupled to the closure base and configured to vent excessive pressurized fuel vapor from the fuel tank filler neck to atmosphere. The filler-neck closure also includes a vacuum-relief valve coupled to the closure base and configured normally to dissipate vacuum in the fuel tank filler neck by admitting atmosphere into the tank.

In illustrative embodiments, the fuel cap further includes a valve mover coupled to the handle to provide means for opening the vacuum-relief valve in response to rotation of the handle in a counterclockwise cap-removal direction by a user so that pressurized fuel vapor in the fuel tank filler neck is vented to the atmosphere through the opened vacuum-relief valve prior to breaking a sealed connection established between the filler-neck closure and the fuel tank filler neck. The vacuum-relief valve is positioned in the closure base to lie laterally alongside the pressure-relief valve and in spaced-apart relation to the vertical axis of rotation. The valve mover is configured to convert rotary movement of the handle into downward movement of the vacuum-relief valve relative to the closure base. This causes the vacuum-relief valve to move from a normally closed position to an opened position and act as a pressure-relief valve to vent pressurized fuel vapor from the fuel tank to the atmosphere during removal of the fuel cap from the filler neck but before separation of the filler-neck closure from the filler neck.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a lawn mower including a fuel cap made in accordance with the present disclosure and mounted on a filler neck protruding from a shroud covering an engine included in the lawn mower;

FIG. 2 is an enlarged perspective view of a portion of the lawn mower of FIG. 1 showing a filler neck provided with external threads and the fuel cap of FIG. 1 configured to mate with the filler neck to close an open mouth opening into a fuel-conducting passageway that is formed in the filler neck and arranged to lead to a fuel tank included in the lawn mower;

FIG. 3 is a diagrammatic view of the fuel cap of FIG. 1 coupled to a filler neck of a fuel tank associated with an outdoor tool showing that the illustrative fuel cap includes a handle, a filler-neck closure including a closure base adapted to mate with the filler neck and a vacuum-relief valve mounted for movement relative to the closure base between closed and opened positions normally to admit atmosphere into the filler neck when negative tank pressure exists in the fuel tank during an automatic pull-down vacuum activation mode of operation, a valve mover coupled to the handle and to the vacuum-relief valve and configured to provide (in an alternative manual push-down user activation mode) means for opening the vacuum-relief valve to allow pressurized fuel vapor in the fuel tank and filler neck to vent past the vacuum-relief valve from the fuel tank to the atmosphere in response to movement (e.g., rotation) of the handle relative to the filler-neck closure during an initial stage of removal of the fuel cap from the fuel tank filler neck, and a closure mover coupled to the handle and to the filler-neck closure and configured to provide means for rotating the filler-neck closure about the axis of rotation relative to the filler neck after the vacuum-relief valve has been moved to the opened position by the valve mover during a final stage of removal of the fuel cap from the fuel tank filler neck;

FIGS. 7-10 show that rotation of the handle in the counterclockwise cap-removal direction causes the vacuum-relief valve to open after an initial rotation of the handle relative to the filler neck and then causes the filler-neck closure to move relative to the filler neck after additional rotation of the handle relative to the filler neck, and there are three illustrative positions, Position A, Position B, and Position C, which are discussed in more detail in the brief descriptions of FIGS. 11-25;

FIG. 7 is a chart graphically representing the effect on the vacuum-relief valve and on the closure base of rotating the handle in the counterclockwise cap-removal direction and showing the relative positions of the vacuum-relief valve and the closure base at Position A, Position B, and Position C;

FIG. 8 is a top plan view of the fuel cap of FIG. 1 showing the handle in illustrative Position A, as suggested in FIG. 7, which is prior to rotation of the handle relative to the fuel tank filler neck in the counterclockwise cap-removal direction;

FIG. 9 is a view similar to FIG. 8 showing the handle in illustrative Position B in response to rotation of the handle in the counterclockwise cap-removal direction through an angle of about 30° but before the valve mover is moved sufficiently (e.g., to 45°) to cause the vacuum-relief valve to move to its opened position;

FIG. 10 is a view similar to FIG. 9 showing the handle in illustrative Position C in response to continued rotation of the handle relative to the fuel tank filler neck in the counterclockwise cap-removal direction so that the handle has been rotated through an angle of about 120°;

FIGS. 11-15 show various components of the fuel cap when the handle is moved to assume illustrative Position A as suggested in FIG. 7;

FIG. 11 is an enlarged sectional view taken along line 11-11 of FIG. 14 (with several components omitted) showing each of the two drive lugs of the handle in a lost-motion slot formed in the torque-transmission ring and showing the two plunger lugs of the handle and suggesting that rotation of the handle in the counterclockwise cap-removal direction will cause the drive lugs to move through their companion lost-motion slots formed in the torque-transmission ring toward their companion drive bands without transferring rotational motion to the torque-transmission ring;

FIG. 12 is an enlarged flat development view of the valve mover showing the position of first and second plunger lugs on a plunger pusher included in the valve mover and showing that rotation of the handle in the counterclockwise cap-removal direction will cause the first and second drive lugs to move along their companion first and second plunger-pusher ramps included in the plunger pusher to cause the plunger pusher to move the vacuum-relief valve downward relative to the handle to assume an opened position as suggested in FIGS. 6, 20, and 25;

FIG. 13 is a view similar to FIG. 8 showing the handle in illustrative Position A as suggested in FIG. 7;

FIG. 14 is a perspective view of the fuel cap of FIG. 2, with portions broken away, revealing the closure mover and the position of the first drive lug in the first lost-motion slot formed in the torque-transmission ring and suggesting the drive lugs can move through their companion lost-motion slots formed in the torque-transmission ring without engaging the cap-removal drive faces included in the torque-transmission ring to assume Position B as illustrated in FIG. 19;

FIG. 15 is a view similar to FIG. 5 showing the vacuum-relief valve in the normally closed position preventing fuel vapor in the filler neck from communicating with atmosphere outside the filler neck;

FIGS. 16-20 show various components of the fuel cap when the handle is moved to assume illustrative Position B as suggested in FIG. 7;

FIG. 16 is a view taken along line 16-16 of FIG. 19 and similar to FIG. 11 showing that the drive lugs have moved through their companion lost-motion slots partly toward their companion drive bands and suggesting that continued rotation of the handle in the counterclockwise cap-removal direction will cause the drive lugs to engage their companion drive bands transferring rotational motion from the handle to the torque-transmission ring and thereby causing the filler-neck closure to rotate about the axis of rotation and move toward an unsealed opened position as suggested in FIGS. 21 and 24;

FIG. 17 is a view similar to FIG. 12 showing the plunger lugs have move along their plunger-pusher ramps in response to rotation of the handle in the counterclockwise cap-removal direction and suggesting that the plunger pusher has moved downwardly causing the vacuum-relief valve to move downwardly and into the opened position as suggested in FIGS. 6, 20, and 25;

FIG. 18 is a view similar to FIG. 9 showing the handle in illustrative Position 13 as suggested in FIG. 7;

FIG. 19 is a view similar to FIG. 14 showing the drive lugs have moved through their companion lost-motion slots and suggesting that rotational motion applied to the handle has not yet been transferred to the torque-transmission ring because the drive lugs in the handle have not yet engaged their companion drive bands included in the torque-transmission ring;

FIG. 20 is a view similar to FIG. 15 showing the vacuum-relief valve has moved downward slightly in response to the valve mover transforming the rotational motion of the handle to a vertical translation of motion the vacuum-relief valve and suggesting that a passageway, formed in the closure base, is opened and pressurized fuel vapor in the filler neck may communicate with atmosphere outside the filler neck to equalize pressure in the tank with the atmosphere;

FIGS. 21-25 show various components of the fuel cap when the handle is moved to assume illustrative Position C as suggested in FIG. 7;

FIG. 21 is a view taken along line 21-21 of FIG. 24 and similar to FIG. 16 showing that the drive lugs have moved through their companion lost-motion slots and engaged their companion drive bands transferring rotational motion of the handle to the torque-transmission ring thereby causing the filler-neck closure to begin to rotate about the axis of rotation and move toward the unsealed opened position;

FIG. 22 is a view similar to FIG. 17 showing the plunger lugs have moved all the way up the plunger-pusher ramps thereby moving the plunger pusher (and plunger) downwardly causing the vacuum-relief valve to move to the opened position as suggested in FIGS. 6 and 25;

FIG. 23 is a view similar to FIG. 10 showing the handle in illustrative Position C as suggested in FIG. 7;

FIG. 24 is a view similar to FIG. 19 showing the first drive lug has moved the full length of the first lost-motion slot to engage the first drive band and showing that the rotational movement of the handle has transferred to the torque-transmission ring which in turn has transferred to the filler-neck closure causing the filler-neck closure to move to the unsealed opened position;

FIG. 25 is a view similar to FIG. 20 showing the vacuum-relief valve has moved to the opened position in response to the plunger lugs moving to the top of their companion plunger-pusher ramps and suggesting that the passageway is fully open allowing the fuel tank pressure to equalize with the atmosphere;

FIG. 26 is a view similar to FIG. 7 showing a chart graphically representing the effects of rotating the handle in a counterclockwise cap-removal direction for another embodiment of the valve mover and on the filler-neck closure and showing the relative positions of the vacuum-relief valve and the filler-neck closure at Position A, Position B*, and Position C;

FIG. 27 is a view similar to FIG. 8 showing the handle in illustrative Position A which is prior to any rotation of the handle in the counterclockwise cap-removal direction suggested in FIG. 26;

FIG. 28 is a view similar to FIG. 9 showing the handle in illustrative Position B* which in response to rotation of the handle to about 42 degrees in the counterclockwise cap-removal direction; and FIG. 29 is a view similar to FIG. 10 showing the handle in illustrative Position C in response to continued rotation of the handle to about 120 degrees in the counterclockwise cap-removal direction.

DETAILED DESCRIPTION

Figure 4:
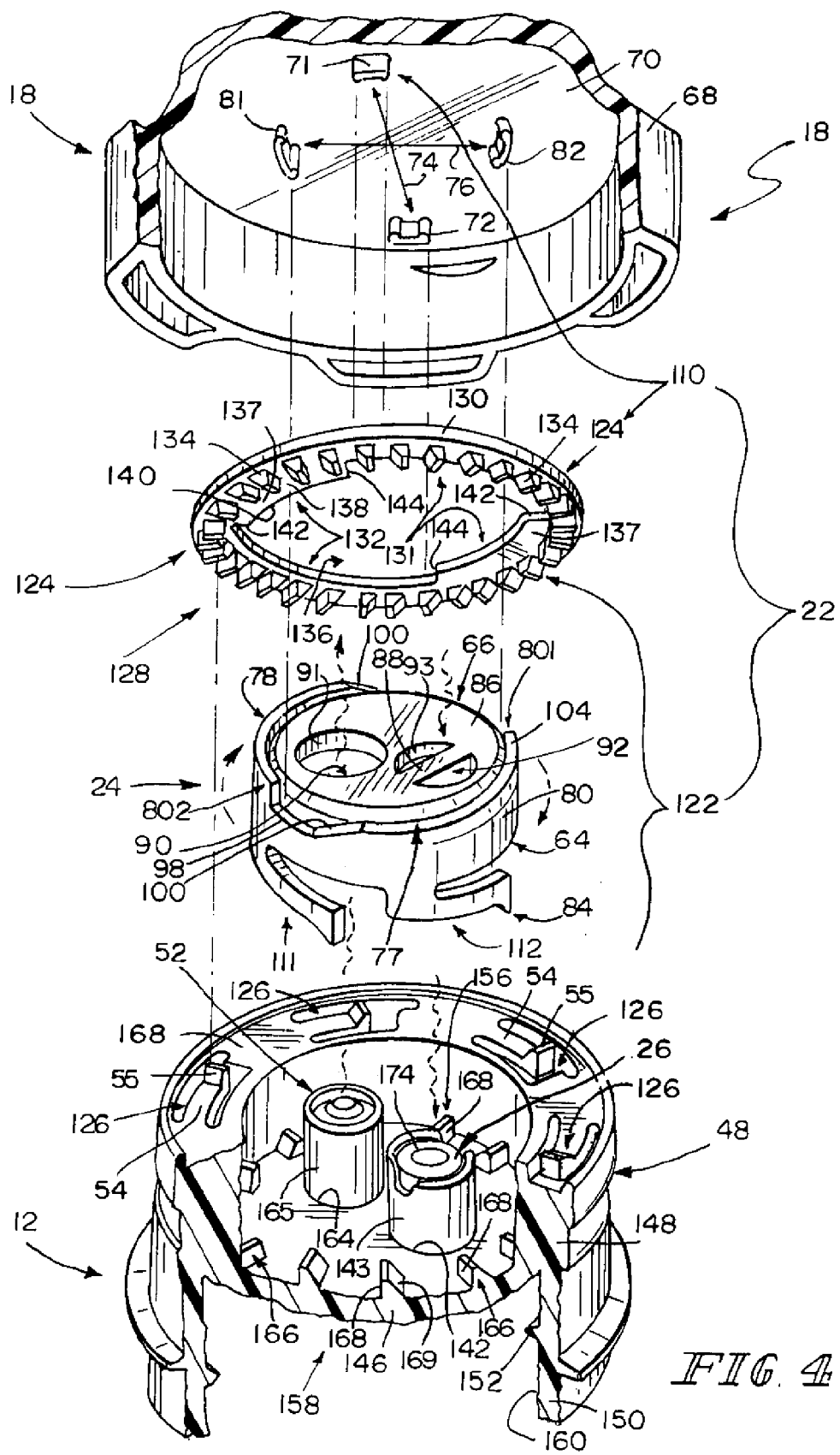
FIG. 4 is an exploded perspective assembly view of the illustrative fuel cap shown in FIG. 2 showing that the fuel cap includes (from bottom to top) a filler-neck closure including a vacuum-relief valve located in the right-side upstanding sleeve included in the closure base and a pressure-relief valve included in the left-side upstanding sleeve included in the closure base, a valve mover including a central plunger, a plunger pusher surrounding the central plunger, and two of the four motion-control arms included in the motion controller and coupled to a lower portion of the plunger pusher, a torque-transmission ring included in the closure mover, and a handle including two drive lugs (at 12 o'clock and 6 o'clock positions) for engaging and turning the torque-transmission ring and two plunger lugs (at 9 o'clock and 3 o'clock positions) for engaging and turning the plunger pusher relative to the plunger to cause the plunger pusher and plunger to move downwardly as a unit so that the plunger engages and moves the vacuum-relief valve to the opened position.

A fuel cap 10 is configured to mount on a fuel tank filler neck 16 as suggested in FIGS. 1 and 2 to close a mouth 15 opening into a fuel-conducting passageway 17 formed in filler neck 16 coupled to a fuel tank 32. Fuel cap 10 includes a filler-neck closure 12 configured to mate with filler neck 16 and to include a vacuum-relief valve 26 and a handle 18 associated with filler-neck closure 12 as shown illustratively in FIGS. 2, 4, and 5 and diagrammatically in FIG. 3. Filler-neck closure 12 also includes a separate pressure-relief valve 52 as suggested in FIGS. 3 and 4.

Figure 5:
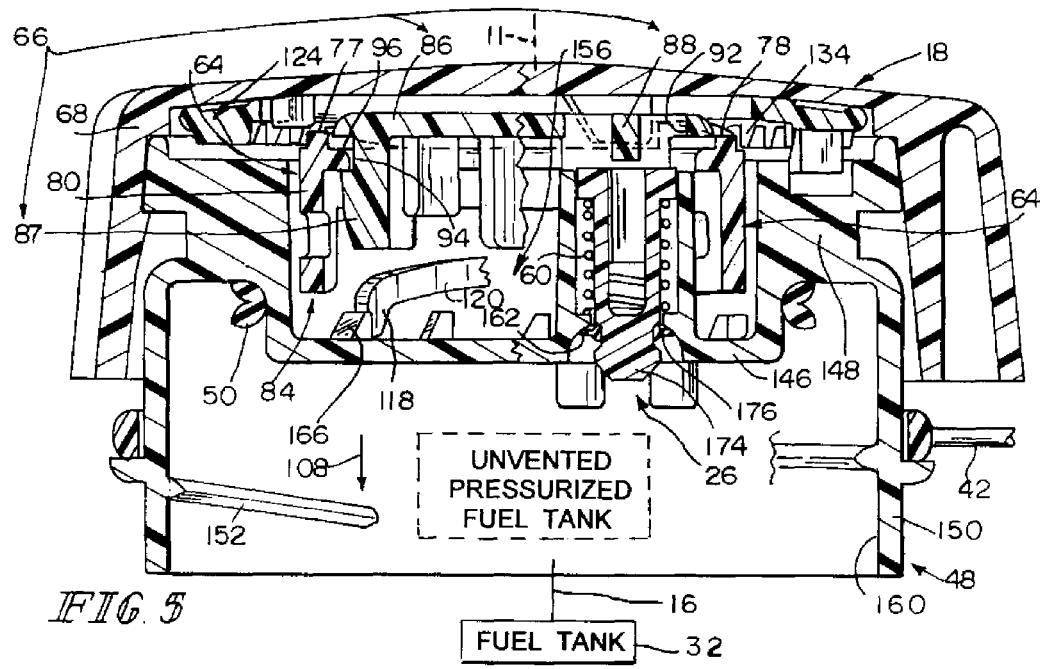
FIG. 5 is an enlarged view of the fuel cap of FIG. 2, with portions broken away, showing that the vacuum-relief valve is in a normally closed position prior to rotation of the handle in a counterclockwise cap-removal direction.
Figure 6:
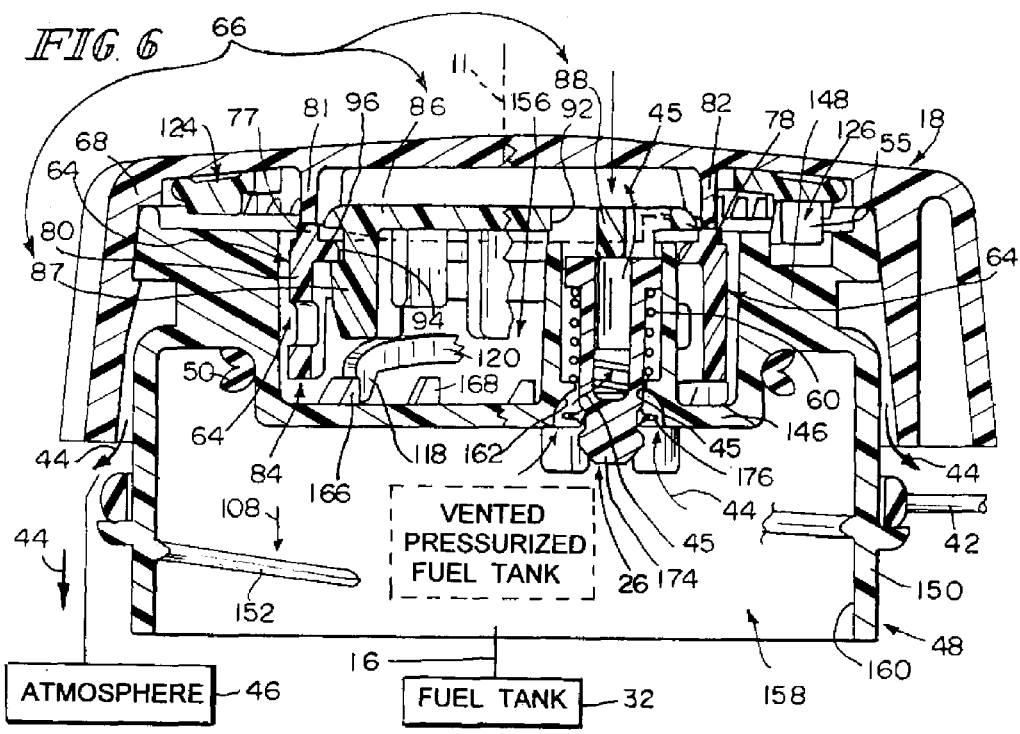
FIG. 6 is a view similar to that of FIG. 5 showing the vacuum-relief valve in the opened position after rotation of the handle in the counterclockwise cap-removal direction to cause the plunger pusher and the plunger to move downwardly as a unit so that a vacuum-valve post in the plunger of the valve mover moves the vacuum-relief valve downwardly relative to the closure base to assume an opened position.

Vacuum-relief valve 26 is mounted for movement on a closure base 48 also included in filler-neck closure 12 as suggested diagrammatically in FIG. 3 and illustratively in FIGS. 5 and 6. In a normal mode 202 of operation, vacuum-relief valve 26 is opened to admit atmosphere into fuel tank filler neck 16 to relieve excess negative tank pressure 49 in fuel tank 32. In an alternative mode 201 of operation, vacuum-relief valve 26 is opened to vent excess pressurized fuel vapor 44 in fuel tank 32 to atmosphere 46. In accordance with the present disclosure, vacuum-relief valve 26 is configured to be opened (automatically) by exposure of vacuum-relief valve 26 to sufficient negative tank pressure 49 extant in fuel tank 32 in a pull-down vacuum activation mode 202 and, alternatively, opened (manually) by a user rotating handle 18 about axis of rotation 11 in a cap-removal direction in a push-down user activation mode 201 as suggested diagrammatically in FIG. 3.

Fuel cap 10 also includes a valve mover 24 coupled to and positioned to lie between handle 18 and vacuum-relief valve 26 in a space provided between handle 18 and closure base 48 as suggested in FIG. 3. Valve mover 24 is configured to apply a downward force 201F (as suggested diagrammatically in FIG. 3) to move (e.g., push) vacuum-relief valve 26 relative to closure base 48 from a normally closed position (shown in solid) downwardly in direction 108 to an opened position (shown in phantom) to vent pressurized fuel vapor 44 extant in fuel tank 32 and filler neck 16 to the atmosphere 46 in push-down user activation mode 201 of fuel cap 10 as suggested in FIG. 3 in response to movement (e.g., rotation) of handle 18 relative to filler neck 16 during removal of fuel cap 10 from filler neck 16. In an illustrative embodiment, vacuum-relief valve 26 is shown in a normally closed position in FIG. 5. Any pressurized fuel vapor 44 extant in fuel tank 32 and fuel-conducting passageway 17 of filler neck 16 is vented past the opened vacuum-relief valve 26 in a controlled manner to atmosphere 46 along a suitable path provided, for example, between closure base 48 and handle 18 as suggested in FIG. 6 before a liquid fuel and fuel vapor seal provided between fuel cap 10 and filler neck 16 is broken and fuel cap 10 is separated from filler neck 16.

As shown diagrammatically in FIG. 7, during removal of fuel cap 10 from filler neck 16, a user will rotate handle 18 manually about an axis of rotation 11 from an original installed position A shown in FIG. 8 to a partly rotated position B shown in FIG. 9 and then to a fully rotated position C shown in FIG. 10. In original installed position A, fuel cap 10 is installed on filler neck 16 as suggested in FIGS. 1, 5, and 8 to close mouth 15 opening into fuel-conducting passageway 17 formed in filler neck 16 and establishing a sealed connection with filler neck 16. In partly rotated position B, handle 18 has been rotated through an angle of about 30° in counterclockwise direction 19 about axis of rotation 11 as suggested in FIGS. 7 and 9. However, as suggested in FIG. 7, once handle 18 has been rotated in counterclockwise direction 19 another 15° (to reach total rotation of 45°), then handle 18 will have moved valve mover 24 relative to closure base 48 to cause valve mover 24 to move vacuum-relief valve 26 downwardly to the opened position (to act as a pressure-relief valve) to vent pressurized fuel tank vapor 44 to atmosphere 46 without separating filler-neck closure 12 from filler neck 16. In fully rotated position C, handle 18 has been rotated through a further angle of about 90° (total rotation of 120°) as suggested in FIGS. 7 and 10 to cause filler-neck closure 12 to separate from filler neck 16 to facilitate removal of fuel cap 10 from filler neck 16. Thus, removal of fuel cap 10 from filler neck 16 is delayed until after vacuum-relief valve 26 first has been activated in push-down user activation mode 201 to vent pressurized fuel vapor to atmosphere 46 and then handle 18 and closure base 48 are rotated further relative to filler neck 16.

Vacuum-relief valve 26 also opens automatically in a pull-down vacuum activation mode 202 as suggested diagrammatically in FIG. 3 when vacuum-relief valve 26 is exposed to sufficient negative tank pressure 49 (i.e., tank vacuum conditions) of fuel vapor 44 extant in fuel tank 32 and fuel-conducting passageway 17 in filler neck 16. In this automatic mode of operation, as suggested in FIG. 3, sufficient vacuum forces 202F are applied to vacuum-relief valve 26 to cause vacuum-relief valve 26 to move relative to closure base 48 downwardly in direction 108 from a normally closed position (shown in solid) to an opened position (shown in phantom) so that ambient air from atmosphere 46 outside fuel cap 10 can flow along a suitable path provided in fuel cap 10 through fuel-conducting passageway 17 in filler neck 16 into fuel tank 32 to relieve any unwanted vacuum condition extant in fuel tank 32.

In an illustrative embodiment, fuel cap 10 is included in an outdoor tool 14 such as a lawn mower as suggested in FIG. 1. Outdoor tool 14 includes a frame 30, a fuel tank 32 carried on frame 30 and coupled to filler neck 16, an engine 34 carried on frame 30, and a shroud 36 coupled to frame 30 and arranged to cover fuel tank 32 and engine 34 as suggested in FIGS. 1 and 2. Outdoor tool 14 also includes a rolling deck 29 configured to carry frame 30 and a push handle 27 coupled to rolling deck 29 as shown, for example, in FIG. 1.

As suggested in FIG. 2, in an illustrative embodiment, fuel cap 10 comprises a filler-neck closure 12 including a closure base 48, a pressure-relief valve 52, vacuum-relief valve 26, a handle 18, a tether 42, and a filler-neck seal 50. Filler-neck seal 50 is carried on closure base 48 as suggested in FIGS. 2 and 5 and configured to mate with an inner wall 16W of filler neck 16 as suggested in FIG. 2 to establish a sealed connection between fuel cap 10 and filler neck 16 when fuel cap 10 is mounted on filler neck 16. Each of pressure-relief valve 52 and vacuum-relief valve 26 is mounted on closure base 48 for independent movement between opened and closed positions and placed in fluid communication with fuel vapor 44 extant in fuel-conducting passageway 17 of filler neck 16 and fuel tank 32 when fuel cap 10 is installed on filler neck 16 as suggested illustratively in FIG. 1 and diagrammatically in FIG. 3. Tether 42 is coupled to each of filler-neck closure 12 and filler neck 16 (or other suitable portion of outdoor tool 14) as suggested in FIGS. 2 and 5 to limit movement of filler-neck closure 12 away from filler neck 16 when filler-neck closure 12 is separated from filler neck 16 as shown, for example, in FIG. 2.

As suggested diagrammatically in FIG. 3 and illustratively in FIG. 4, fuel cap 10 includes a handle 18, a filler-neck closure 12 including a closure base 48, a vacuum-relief valve 26 mounted for movement on closure base 48 between opened and closed positions, a pressure-relief valve 52 mounted for movement on closure base 48 between opened and closed positions, and a filler neck seal 50 coupled to closure base 48 to move therewith and mate with filler neck 16. Fuel cap 10 also includes a suitable closure mover 22 configured to provide means for rotating filler-neck closure 12 about axis of rotation 11 to engage or disengage filler neck 16 in response to rotation of handle 18 about axis of rotation 11. Closure mover 22 is coupled to closure base 48 of filler neck closure 12, as suggested diagrammatically in FIG. 3 and illustratively in FIGS. 5 and 6.

A valve mover 24 is also included in fuel cap 10 and configured to provide means for moving vacuum-relief valve 26 relative to closure base 48 to the opened tank-venting position (shown in phantom in FIG. 3) in response to rotation of handle 18 in a counterclockwise cap-removal direction 19 before filler-neck closure 12 is rotated to disengage filler neck 16. Thus, valve mover 24 functions to move vacuum-relief valve 26 during cap removal in push-down user activation mode 201 as suggested in FIG. 3 without disrupting a normal vacuum-relief function of vacuum-relief valve 26 to move to an opened position admitting ambient air from atmosphere 46 into fuel tank 32 when exposed to sufficient negative tank pressure 49 in fuel tank 32 in pull-down vacuum activation mode 202 a suggested in FIG. 3.

Closure base 48 includes a round plate 146 formed to include a first orifice 142 associated with vacuum-relief valve 26 and a second orifice 164 associated with pressure-relief valve 52 as shown, for example, in FIG. 4. Closure base 48 also includes an upright first sleeve 143 coupled to plate 146 at first orifice 142 as shown in FIG. 4 and configured to support vacuum-relief valve 26 for sliding movement relative to plate 146 between the closed and opened positions as suggested in FIGS. 5 and 6. An upright second sleeve 165 is coupled to plate 146 at second orifice 164 as shown in FIG. 4 and configured to support pressure-relief valve 52 for sliding movement relative to plate 146 between closed and opened positions.

Closure base 48 further includes a relatively thick upper ring 148 coupled to a perimeter edge of round plate 146 and arranged to extend upwardly to surround first and second sleeves 143, 165 and a relatively thin lower ring 150 coupled to a lower end of upper ring 148 and arranged to extend downwardly away from first and second sleeves 143, 165 as shown, for example, in FIG. 4. An inner thread 152 is appended to an inner surface 160 of lower ring 150 and configured to mate with an external thread 154 included in fuel tank filler neck 16 as suggested in FIGS. 2 and 4 in accordance with an illustrative embodiment of the present disclosure.

As suggested in FIG. 4, an upwardly facing top portion of upper ring 48 is coupled to a series of circumferentially spaced-apart ratchet members 126 included in a torque-limit signaler 122 included in closure mover 22. Each ratchet member 126 includes a flexible spring arm 54 and a spring head 55 on a free end of spring arm 54. One end of spring arm 54 is cantilevered to upper ring 48 and the free end of spring arm 54 carries spring head 55 up and down as the spring arm 54 flexes, bends, or deflects during cap installation and removal.

As suggested in FIGS. 3 and 4, closure mover 22 includes a torque-transmission ring 124 and a torque-limit signaler 122. Torque-transmission ring 124 is configured to lie between and mate with drive lugs 71, 72 included in handle 18 and ratchet members 126 coupled to closure base 48 as suggested in FIG. 4. Drive lugs 71, 72, torque-transmission ring 14, and ratchet members 126 cooperate to provide means for rotating filler-neck closure 12 about axis of rotation 11 relative to filler neck 16 in response to rotation of handle 18 relative to filler neck 16. Reference is hereby made to U.S. Pat. No. 6,739,472, which reference is hereby incorporated in its entirety herein, for disclosure of a torque-transmission and torque-signaler system in a fuel cap.

As suggested diagrammatically in FIG. 3, valve mover 24 is configured to mate with handle 18, vacuum-relief valve 26, and closure base 48. Valve mover 24 is configured to move downwardly along axis of rotation 11 in direction 108 to move vacuum-relief valve 26 from a normally closed position (shown in solid) to a temporarily opened position (shown in phantom) in response to rotation of handle 18 in counterclockwise cap-removal direction 19 in push-down user activation mode 201 so that pressurized fuel vapor 44 vents from fuel tank 32 to atmosphere 46.

In an illustrative embodiment, valve mover 24 comprises a plunger 66 including a vacuum-valve post 88 arranged to engage and move vacuum-relief valve 26 during downward movement of valve mover 24, a plunger pusher 64 coupled to plunger 66 and to handle 18, and a motion controller 84 coupled to plunger pusher 64 and arranged to mate with a plate 146 and rotation-blocking teeth 166 included in closure base 48 of filler-neck closure 12. Motion controller 84 has two functions: (1) block rotation of plunger pusher 64 about axis of rotation 11 during rotation of handle 18 in cap-removal direction 19 but allow such rotation of plunger pusher 64 during rotation of handle 18 in cap-installation direction and (2) move plunger pusher 64 (and plunger 66) upwardly away from closure base 48 whenever handle 48 is turned to its original cap-installation position relative to closure base 48.

Motion controller 84 has a rotation-blocking function and is configured to provide rotation-control means for blocking rotation of plunger pusher 64 about axis of rotation 11 without substantially inhibiting downward movement of plunger pusher 64 (and plunger 66) along axis of rotation 11 in direction 108 during rotation of handle 18 in counterclockwise cap-removal direction 19 and for allowing rotation of plunger pusher 64 about axis of rotation 11 during rotation of handle 18 relative to filler neck 16 in an opposite clockwise cap-installation direction. Valve mover 24 and, in particular, vacuum-valve post 88 of plunger 66 does not inhibit movement of vacuum-relief valve 26 from the closed position to the opened position during pull-down vacuum activation mode 202 as also suggested diagrammatically in FIG. 3.

Motion controller 84 also has a spring function and is also configured to provide means for yieldably moving plunger pusher 64, plunger 66, and handle 18 upwardly relative to closure base 48 after the user ungrips handle 18 during cap-removal activities and in response to rotation of handle 18 about axis of rotation 11 in cap-installation direction 21. This is a return-spring function that restores the downwardly moved plunger pusher 64, plunger 66, and handle 18 to an original elevation relative to closure base 48 once handle 18 is returned to its original cap-installation position relative to closure base 48.

Plunger 66 includes a plunger disk 86, a guide ring 87, and a vacuum-valve post 88 as shown, for example, in FIGS. 4-6. Guide ring 87 is appended to a perimeter portion of plunger disk 86 and arranged to extend downwardly in direction 108 so as to surround vacuum-relief valve 26 and pressure-relief valve 52. Vacuum-valve post 88 is appended to the underside of plunger disk 86. Vacuum-valve post 88 is arranged to lie in an interior region bounded by guide ring 87 so that vacuum-valve post 88 will engage and move vacuum-relief valve 26 to an opened position in response to movement of plunger 66 and the rest of valve mover 26 in downward direction 108.

Plunger pusher 64 includes a plunger carrier 80 coupled to guide ring 87 and first and second lug-receiver units 801, 802 coupled to an upper portion of plunger carrier 80 as suggested in FIG. 4. First lug-receiver unit 801 is configured and arranged to mate with downwardly extending first plunger lug 81 of handle 18. Second lug-receiver unit 801 is configured and arranged to mate with downwardly extending second plunger lug 82 of handle 18.

Plunger carrier 80 is formed to include a central chamber for receiving plunger 66 therein as suggested in FIGS. 4-6. Plunger carrier 80 is arranged to surround plunger 66 and mate with guide ring 87 to support plunger pusher 64 for rotation relative to plunger 66. During use, plunger 66 is mounted so that it does not rotate relative to closure base 48 to cause pressure-vent orifice 90 formed in plunger disk 86 of plunger 66 to remain aligned with second sleeve 165 and pressure-relief valve 52 in second sleeve 165 and to cause vacuum-vent orifice 92 formed in plunger disk 86 to remain aligned with first sleeve 143 and vacuum-relief valve 26 in first sleeve 143. Nevertheless, plunger 66 is free to move up and down along axis of rotation 11 in response to up-and-down movement of plunger pusher 64 to control opening and closing movement of vacuum-relief valve 26.

Push-down user activation mode 201 is in effect when user 20 rotates handle 18 in counterclockwise cap-removal direction 19 about a vertical axis 11 suggested in FIG. 3. Handle 18 cooperates with valve mover 24 to convert rotational motion about vertical axis 11 into vertical translational motion. Valve mover 24 causes vacuum-relief valve 26 to move from the normally-closed position shown in FIG. 5 to the opened position shown in FIG. 6, thereby allowing any accumulated pressure in filler neck 16 and fuel tank 32 to be vented to atmosphere 46. Pressure in filler neck 16 and fuel tank 32 is vented before closure mover 22 engages and moves filler-neck closure 12 into the unsealed opened position, thereby breaking a liquid and fuel vapor seal between closure base 48 and filler neck 16.

Valve mover 24, included in fuel cap 10, is configured to vent pressurized fuel vapor 44 to atmosphere 46 prior to breaking the liquid fuel and fuel vapor seal established between fuel cap 10 and fuel tank filler neck 16 during removal of fuel cap 10. As illustrated in FIG. 3, valve mover 24 illustratively includes a plunger pusher 64 and a plunger 66. Plunger pusher 64 and plunger 66 are positioned to lie between handle 18 and base 48. Plunger pusher 64 is coupled to plunger 66 so that plunger 66 is constrained to move upwardly and downwardly with plunger pusher 64. Illustratively, plunger 66 may rotate about vertical axis 11 relative to plunger pusher 64 and plunger 66 is locked against rotation about vertical axis 11 relative to base 48.

Plunger pusher 64, as shown in FIG. 3, illustratively includes first and second plunger-pusher ramps 77, 78 and a plunger carrier 80. Plunger-pusher ramps 77, 78 are appended to the top surface of plunger carrier 80 and configured to cooperate with handle 18. Motion controller 84 is coupled to the bottom of plunger carrier 80 and is configured to cooperate with closure base 48 during installation and removal of fuel cap 10.

First and second plunger ramps 77, 78 illustratively include a lower-starting portion 98, an inclined portion 100, and a platform portion 102. Lower-starting portion 98 is approximately the same length as the plunger lugs 81, 82. Inclined portion 100 is coupled to lower-starting portion 98 on the left and extends along a circular path upwardly toward platform portion 102 on the right as shown in FIGS. 12, 17, and 23. Each platform portion 102 of plunger ramps 77, 78 is formed to include an upper-support surface 104 and a left wall 106.

As an example, plunger 66 includes a plunger disk 86, a plunger-guide ring 87, and vacuum-valve post 88. Plunger-guide ring 87 is appended to the underside of plunger disk 86 and is constrained to move with plunger carrier 80 in up-and-down directions along axis of rotation 11. Furthermore, plunger-guide ring 87 may be continuous or broken into multiple sections. Plunger-guide ring 87 is formed to include a carrier slot 94. Carrier slot 94 is formed to mate with a plunger-carrier band 96 appended to the interior surface of plunger carrier 80. Plunger-carrier band 96 and carrier slot 94 cooperate to permit plunger carrier 80 to rotate about axis of rotation 11 relative to the non-rotatable plunger 66 without substantial restriction.

A vent pathway 45 is provided in fuel cap 10 so that pressurized fuel vapor 44 can be expelled in a controlled manner during venting. An example of vent pathway 45 is illustrated in FIG. 6. A portion of vent pathway 45 is contained in plunger disk 86. Plunger disk 86 is formed to include a pressure-vent orifice 90 and a vacuum-vent orifice 92. Pressure-vent orifice 90 is positioned to lie above and in alignment with pressure-relief valve 52 coupled to closure base 48 as suggested in FIG. 4. Pressure-vent orifice 90 is defined by a pressure-vent edge 91 having a generally circular shape. Vacuum-vent orifice 92 is positioned to lie above and in alignment with vacuum-relief valve 26 coupled to closure base 48 as suggested in FIG. 4. Vacuum-vent orifice 92 is defined by a vacuum-vent edge 93 having a generally circular shape. Vacuum-valve post 88 is appended to plunger disk 86 and arranged to extend across vacuum-vent orifice 92 and to extend downwardly towards vacuum-relief valve 26 as suggested in FIGS. 4-6.

Handle 18 is configured to be gripped by a user and rotated about vertical axis 11 in clockwise cap-installation direction 21 during installation and in counterclockwise cap-removal direction 19 during removal as suggested in FIGS. 9 and 10. An example of handle 18 is shown in FIG. 4 and is formed to include an outer shell 68, first and second drive lugs 71, 72, and first and second plunger lugs 81, 82. Drive lugs 71, 72 are appended to a downwardly facing inner surface 70 of outer shell 68 as shown, for example, in FIG. 4. Drive lugs 71, 72 are positioned to lie in spaced-apart relation to one another at a first distance 74. Plunger lugs 81, 82 are appended to inner surface 70 of outer shell 68 and are positioned to lie in spaced-apart relation to one another at a second distance 76. Illustratively, first distance 74 is larger than second distance 76. Inner surface 70 is oriented to face toward closure base 48 as suggested in FIGS. 4-6.

During removal of fuel cap 10 from fuel tank filler neck 16, handle 18 is rotated in counterclockwise cap-removal direction 19 as suggested in FIGS. 7-10. First and second plunger lugs 81, 82 of handle 18 are constrained to move along their companion plunger-pusher ramps 77, 78 causing plunger pusher 64 to move in a downward direction 108 with respect to handle 18. Plunger 66 is coupled to plunger pusher 64 to move downwardly therewith causing vacuum-valve post 88 to engage and move vacuum-relief valve 26 from the closed position to the opened position as suggested in FIGS. 5 and 6. After rotation of handle 18 in counterclockwise cap-removal direction 19 has ceased, motion controller 84 exerts an upward force on plunger carrier 80 to move plunger carrier 80 in an upward direction 109 carrying plunger 66 and vacuum-valve post 88 out of contact with vacuum-relief valve 26 permitting vacuum-relief valve 26 to return to its normally closed position.

FIGS. 12, 17, and 23 illustrate plunger lugs 81, 82, moving along their companion plunger-pusher ramps 77, 79 as handle 18 is rotated in counterclockwise cap-removal direction. FIG. 12 illustrates that plunger lugs 81, 82 are biased into the position shown by motion controller 84. Motion controller 84 provides a yieldable spring force that pushes plunger carrier 80 upward relative to closure base 48, thereby causing plunger lugs 81, 82 to move along their companion plunger-pusher ramps 77, 78 to assume the position shown in FIG. 12.

As suggested in FIG. 12, when handle 18 is in initial stages of movement, plunger lug 81 is positioned to lie on lower-starting portion 98 of first plunger-pusher ramp 77 and adjacent to left wall 106 of second plunger-pusher ramp 78. As suggested in FIG. 17, rotation of handle 12 approximately 30 degrees causes first plunger lug 81 to move partly up inclined portion 100. As plunger lugs 81, 82 move further along their companion plunger-pusher ramps 77, 78, plunger pusher 64 moves in a downward direction 108 relative to handle 18 causing vacuum-relief valve 26 to move partly to the opened position as suggested in FIG. 20. Rotation of handle 12 to approximately 120 degrees is shown in FIG. 23 to cause first plunger lug 81 to move onto platform portion 102 causing plunger pusher 64 to move completely downward to cause vacuum-relief valve 26 to move fully into the opened position as shown in FIG. 25.

Motion controller 84, as illustrated in FIGS. 4, 12, 17, and 23 is formed to include, for example, four motion-control arms 111, 112, 113, and 114. Motion-control arm 111 includes an arm mount 116, return head 118, and a return-head support 120 interconnecting arm mount 116 and return head 118. Motion-control arm 111 is substantially the same as the other motion-control arms 112, 113 and 114. Motion-control arm 111 is appended to the bottom of plunger carrier 80 at arm mount 116. Return head 118 is configured to engage a flat stop face 168 of an upright rotation-blocking tooth 166 of closure base 48 when handle 18 is rotated in counterclockwise cap-removal direction 28 to prevent rotation of plunger pusher 64 relative to closure base 48 about axis of rotation 11. Return head 118 is configured further to permit rotation of plunger pusher 64 relative to fuel tank filler neck 16 when handle 18 is rotated in a clockwise cap-installation direction 21 owing to periodic camming engagement of inclined surface 169 of rotation-blocking tooth 166 and an inclined surface on return head 118 of each motion-control arm 111, 1112, 113, or 114.

Valve mover 24 is configured primarily to vent pressurized fuel vapor existing in fuel tank filler neck 16 during removal of fuel cap 10. Illustratively, valve mover 24 is configured to open vacuum-relief valve 26 during rotation of handle 18 before torque is transferred from handle 18 to filler-neck closure 12. Closure mover 22, as suggested, for example in FIG. 4, helps to make this possible.

As suggested in FIG. 4, closure mover 22 includes a lost-motion driver 110 and torque-limit signaler 122 coupled to closure base 48. Lost-motion driver 110 provides interaction between drive lugs 71, 72 and a torque-transmission ring 124 included in fuel cap 10 to allow a delay in torque transmission from handle 18 to torque-transmission ring 124 during cap removal until after valve mover 24 has moved vacuum-valve 26 to the opened position. An illustrative ratchet component 126 coupled to closure base 48 and torque-transmission ring 124 cooperate to define a torque-limit signaler 122, as shown, for example, in FIG. 4. Torque-limit signaler 122 provides an audible feedback to a user 21 when sufficient torque has been applied to closure base 48 during cap installation to seal fuel cap 10 on fuel tank filler neck 16.

Torque-transmission ring 124, as illustrated in FIG. 4, for example, is formed to include a ratchet 128 and first and second drive-lug receivers 131, 132. Ratchet 128 is formed to include an annular ratchet race 130 and a plurality of drive teeth 134 coupled to an underside of race 130 as shown, for example, in FIG. 4. Annular ratchet race 130 is formed to include a plunger-pusher orifice 140 and configured to permit plunger lugs 81, 82 to engage their companion plunger-pusher ramps 77, 78 without restriction or interference from torque-transmission ring 124. Drive teeth 134 are appended to the underside of annular ratchet race 130 and configured to engage multiple ratchet components 126 formed in closure base 48 as suggested in FIGS. 4-6.

First drive-lug receiver 131 includes first lost-motion slot 135 and a first drive band 137 as suggested in FIGS. 4 and 11. Second drive-lug receiver 132 includes second lost-motion slot 136 and a second drive band 138 as suggested in FIGS. 4 and 11. Second drive-lug receiver 132 is substantially the same as first drive-lug receiver 131 and only first drive-lug receiver 131 will be discussed in detail herein. First lost-motion slot 135 is formed in annular ratchet race 130 and opens into plunger-pusher orifice 140.

First and second lost-motion slots 135, 136 are positioned to lie on a lost-motion circle. First lost-motion slot 135 and second lost-motion slot 136 have an arc length defined by a central angle of about 111 degrees. Illustratively, first and second lost-motion slots 135, 136 are positioned to lie in spaced apart relation to one another on the lost-motion circle.

First drive band 137 includes a cap-installation drive face 142 and a cap-removal drive face 144. As shown in FIGS. 11, 16, and 21, torque-transmission ring 124 is formed to include first lost-motion slot 135, cap-removal drive face 144 of first drive band 137, first drive band 137, cap-installation drive face 142 of first drive band 137, second lost-motion slot 136, cap-removal drive face 144 of second drive band 138. Movement of drive lugs 71, 72 through their companion lost-motion slots 135, 136 prior to engaging either the cap-removal drive face 144 or cap-installation drive face 142 accounts for the lost-motion feature observed in use of fuel cap 10 by a user which allows for valve mover 24 to open vacuum-relief valve 26 before torque-transmission ring 124 is rotated to turn filler-neck closure 12 in fuel tank filler neck 16 during removal of fuel cap 10 from filler neck 16.

Seal plate 146, as shown in FIG. 4, is formed to include a vacuum-relief valve orifice 162, a pressure-relief valve orifice 164, and a series of rotation-blocking teeth 166. Vacuum-relief valve orifice 162 is configured to open through seal plate 146 and vacuum-relief valve 26 is appended to and configured to seal vacuum-relief valve orifice 162. Pressure-relief valve 52 is appended to and configured to seal pressure-relief valve orifice 164. Rotation-blocking teeth 166 are positioned to lie adjacent to upper closure wall 148 and are appended to seal plate 146. Rotation-blocking teeth 166 are configured to cooperate with return heads 118 included in motion controller 84 to prevent rotation of plunger pusher 64 relative to closure base 48 when handle 18 is moved in counterclockwise cap-removal direction 19 and further configured to permit rotation of plunger pusher 64 relative to closure base 48 when handle 18 is rotated in clockwise cap installation direction 21.

Each ratchet member 126 coupled to upper ring 148 of closure base 48 includes a ratchet-engagement ramp 55 coupled to a deflection arm 54 coupled to upper ring 148. Drive teeth 134 of torque-transmission ring 124 are configured to engage each ratchet-engagement ramp 55, thereby transmitting torque from handle 18 through torque-transmission ring 124 finally to ratchet-engagement ramp 55, thereby causing closure base 48 to move.

When handle 18 is rotated in clockwise cap-installation direction 21, torque is transmitted to closure base 48 until sufficient torque has been applied to allow drive teeth 134 to move ratchet-engagement ramps 55 bending downwardly deflection arms 54. The sound made by drive teeth 134 moving over ratchet-engagement ramps provides feedback to user 21 that a sufficient amount of torque has been applied minimizing the possibility of applying too much torque to fuel cap 10 and damaging filler neck seal 50.

Vacuum-relief valve 26 can be opened in either push-down user activation mode 201 through use of valve mover 24 or in pull-down vacuum activation mode 202 through the exposure of vacuum-relief valve 26 to sufficient negative tank pressure 58 in fuel tank 32. Illustratively, vacuum-relief valve includes a vacuum-valve body 174, a vacuum-valve seal 176, and a vacuum-valve bias spring 178. Vacuum-valve body 174 is configured to lie in a vacuum-valve mount 180 included in and appended to seal plate 146 of closure base 48. Vacuum-valve bias spring 178 is positioned to lie between vacuum-valve body 174 and vacuum-valve mount 180 and arranged to urge vacuum-valve body 174 downwardly so that vacuum-relief valve 26 is moved to assume the position bringing vacuum-valve seal 176 into contact with seal plate 146 preventing communication of an interior region formed in fuel tank filler neck 16 with atmosphere 46.

Illustratively, fuel cap 10 is configured to close a mouth 15 opening into a fuel-conducting passageway 17 formed in fuel tank filler neck 16. Sealed connection creates a low permeation connection thereby reducing the emission of fuel vapor 44 to atmosphere 46. Reduced hydrocarbon emissions from the substantially sealed connection allow small engine applications to come into compliance with new EPA/Carb regulations. Liquid fuel maybe expelled on a user when opening fuel cap 10 if pressurized fuel vapor exists in filler neck 16. Venting of pressurized fuel vapor 44 to atmosphere prior to opening fuel cap 10 minimizes expulsion of liquid fuel.

The establishment of a substantially sealed fuel tank also creates an opportunity for fuel vapor 44 to increase in pressure relative to atmosphere 46, possibly as a result of fuel tank 32 heating while being left in the sun. The pressurized tank may force liquid fuel out of the tank when opening fuel cap 10 if the pressure in fuel tank 32 is not removed prior to breaking the seal between fuel cap 10 and fuel tank filler neck 16. Valve mover 24 included in fuel cap 10 permits the pressure in fuel tank 32 to be reduced prior to breaking the seal between filler neck 16 and base 48 by opening vacuum-relief valve 26 as illustrated in push-down user activation mode 201.

Figure 26:
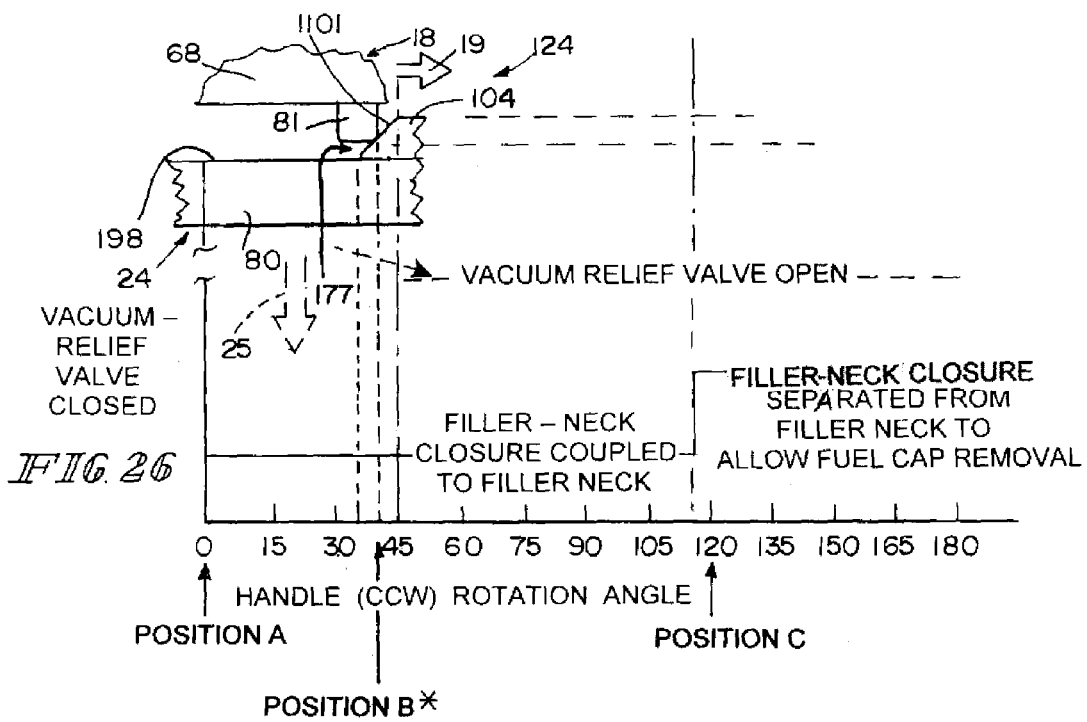
FIGS. 26-29 show that rotation of the handle in the counterclockwise cap-removal direction from Position A through an angle of about 42° to assume Position B* causes the vacuum-relief valve to open and through a further angle of about 78° to assume Position C causes the closure to begin opening.
Figures 27, 28:
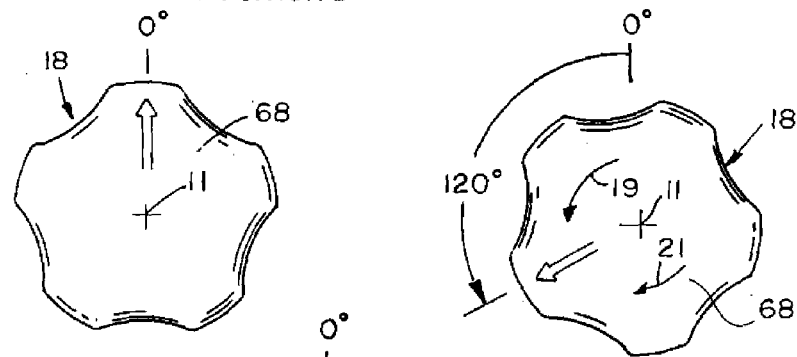
Figure 29:
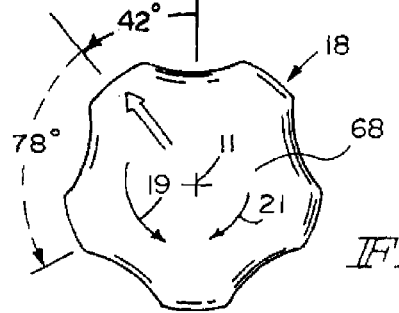

As suggested in FIG. 7, one illustrative embodiment shows plunger lug 81 moving up its companion plunger-pusher ramp 77 during rotation of handle 18 from 0 degrees through 45 degrees resulting in vacuum-relief valve 26 moving from the normally closed position to the opened position. As suggested in FIG. 26, another embodiment of fuel cap 10 includes a plunger-pusher ramp 177. Plunger-pusher ramp 177 illustratively has a greater angle of incline than plunger-pusher ramp 77. The greater angle of incline results in plunger lug 81 moving along lower-starting position 198 from 0 to about 40 degrees and then moving up inclined portion 1101 from 40 to 45 degrees. Plunger-pusher ramps 177, 178, as suggested in FIG. 29, are configured to have a steep angle of incline so that plunger lugs 81, 82 are discouraged from inadvertently moving up plunger-pusher ramps 177, 178 causing vacuum-relief valve 26 to open briefly.

The invention claimed is:

1. A fuel cap engageable with a fuel tank filler neck, the fuel cap comprising
a filler-neck closure including a closure base adapted to mate with a fuel tank filler neck to close a mouth opening into a fuel-conducting passageway formed in the fuel tank filler neck, a pressure-relief valve mounted in a first vent passageway formed in the closure base for movement relative to the closure base from a normal closed position blocking flow of fuel vapor extant in the fuel tank filler neck through the first vent passageway to atmosphere outside of the fuel cap to an opened position allowing flow of pressurized fuel vapor extant in the fuel tank filler neck through the first vent passageway to the atmosphere in response to exposure of the pressure-relief valve to pressurized fuel vapor extant in the fuel tank filler neck and characterized by a positive pressure in excess of a predetermined positive pressure, and a vacuum-relief valve mounted in a second vent passageway formed in the closure base non-concentrically with the first vent passageway for independent movement relative to the closure base from a normally closed position blocking flow of air from the atmosphere through the second vent passageway into the fuel tank filler neck and an opened position allowing flow of air from the atmosphere through the second vent passageway into the fuel tank filler neck in response to exposure of the vacuum-relief valve to fuel vapor extant in the fuel tank filler neck and characterized by negative pressure in excess of a predetermined negative pressure,
a handle arranged to overlie the filler-neck closure to form a space therebetween and supported for rotation about an axis of rotation relative to the filler-neck closure, and
a valve mover located in the space provided between the handle and the filler-neck closure and configured to mate with the handle to provide means for moving the vacuum-relief valve from the closed position to the opened position in response to rotation of the handle about the axis of rotation in a cap-removal direction to vent any pressurized fuel vapor extant in the fuel tank filler neck through the second vent passageway past the vacuum-relief valve to the atmosphere while the pressure-relief valve remains in the closed position without disrupting movement of the vacuum-relief valve to the opened position in response to exposure of the vacuum-relief valve to fuel vapor extant in the fuel tank filler-neck and characterized by negative pressure in excess of the predetermined negative pressure.

2. The fuel cap of claim 1, further comprising a closure mover coupled to the handle and to the filler-neck closure and configured to rotate the filler-neck closure about the axis of rotation relative to the fuel tank filler neck in response to rotation of the handle about the axis of rotation in the cap-removal direction to separate the filler-neck closure from the fuel tank filler neck and wherein the closure mover is configured to provide means for delaying application of a rotation-inducing force to the filler-neck closure during rotation of the handle about the axis of rotation in the cap-removal direction until after the valve mover has been moved by the handle to cause the vacuum-relief valve to move from the closed position to the opened position.

3. The fuel cap of claim 2, wherein the closure mover includes a torque-transmission ring configured to mate with the handle during rotation of the handle about the axis of rotation in the cap-removal direction and supported for rotation about the axis of rotation in the space provided between the handle and the filler neck closure.

4. The fuel cap of claim 3, wherein the torque-transmission ring is formed to include a central aperture and the valve mover is arranged to extend through the central aperture and the valve mover is arranged to lie in a generally stationary position in the space provided between the handle and the filler-neck closure during an initial stage of rotation of the handle about the axis of rotation to cause the torque-transmission ring to rotate about the axis of rotation relative to the valve mover.

5. The fuel cap of claim 3, wherein the torque-transmission ring is arranged to lie between the pressure-relief and vacuum-relief valves and the valve mover is arranged to extend through a central aperture formed in the torque-transmission ring to communicate with the vacuum-relief valve during movement of the valve mover relative to the filler-neck closure.

6. The fuel cap of claim 2, further comprising a filler-neck seal coupled to the filler-neck closure to move therewith and to mate with the fuel tank filler neck to establish a liquid fuel and fuel vapor seal therebetween upon movement to the filler-neck closure to an installed position closing the mouth formed in the fuel tank filler neck and the vacuum-relief valve is configured to be moved relative to the filler-neck closure by the valve mover to the opened position before the filler neck seal is moved relative to the fuel tank filler neck in response to rotation of the filler-neck closure to break the liquid fuel and fuel vapor seal established between the filler-neck closure and the fuel tank filler neck.

7. The fuel cap of claim 1, wherein the valve mover includes a plunger arranged to overlie and communicate with the vacuum-relief valve and configured to apply a downward force to the vacuum-relief valve to move the vacuum-relief valve from the normally closed position to the opened position to vent pressurized fuel vapor from the fuel tank filler neck through a passageway formed in the fuel cap to the atmosphere in response to movement of the handle relative to the filler neck during removal of the fuel cap from the filler neck.

8. The fuel cap of claim 7, wherein the valve mover further includes a plunger pusher supported for rotation about the axis of rotation relative to the plunger and for united up-and-down axial movement with the plunger along the axis of rotation and the plunger pusher is configured to mate with the handle to provide means for converting rotational movement of the handle about the axis of rotation in the cap-removal direction into downward axial movement of the plunger to move the plunger to apply the downward force to the vacuum-relief valve to the opened position before any substantial movement of the filler-neck closure relative to the fuel tank filler neck.

9. The fuel cap of claim 8, wherein the plunger pusher includes an inclined ramp, the handle includes an outer shell and a plunger lug coupled to the outer shell and arranged to extend downwardly from the outer shell to mate with the inclined ramp during rotation of the handle about the axis of rotation in the cap-removal direction and the inclined ramp has a positive slope to cause the plunger lug to apply a downward force to the inclined ramp during rotation of the handle about the axis of rotation to cause the plunger pusher and plunger to move as a unit downwardly along the axis of rotation to cause the plunger to move the vacuum-relief valve to the opened position.

10. The fuel cap of claim 8, wherein the valve mover further includes a motion controller coupled to the plunger pusher and configured to mate with the filler-neck closure and provide rotation-control means for blocking rotation of the plunger pusher about the axis of rotation without substantially inhibiting movement of the plunger pusher and the plunger along the axis of rotation in a downward direction to allow the plunger to move the vacuum-relief valve from the normally closed position to the opened position in response to rotation of the handle in the cap-removal direction.

11. The fuel cap of claim 8, wherein the valve mover further includes a motion controller coupled to the plunger pusher and configured to mate with the filler-neck closure to provide return means for yieldably moving the plunger pusher, plunger, and handle along the axis of rotation in an opposite upward direction in response to rotation of the handle about the axis of rotation in a cap-installation direction that is opposite to the cap-removal direction to allow the vacuum-relief valve to move upwardly from the opened position to the normally closed position.

12. The fuel cap of claim 8, wherein the valve mover further includes a motion-control arm coupled to a lower portion of the plunger pusher, the motion-control arm includes an arm mount coupled to the lower portion of the plunger pusher, a return head, and a return-head support arranged to interconnect the arm mount and the return head, the return head is configured to engage a flat stop face of an upright rotation-blocking tooth included in a series of rotation-blocking teeth included in the closure base when the handle is rotated in a cap-removal direction to prevent rotation of the plunger pusher relative to the closure base about the axis of rotation, and the return head is configured further to permit rotation of the plunger pusher about the axis of rotation relative to the fuel tank filler neck when the handle is rotated about the axis of rotation in an opposite cap-installation direction owing to periodic camming engagement of an inclined surface of the rotation-blocking teeth and an inclined surface on the return head.

13. A fuel cap engageable with a fuel tank filler neck, the fuel cap comprising a filler-neck closure adapted to move relative to a fuel tank filler neck and close a mouth opening into a fuel-conducting passageway formed in the fuel tank filler neck, the filler-neck closure including a closure base, a pressure-relief valve coupled to the closure base and configured to vent excessive pressurized fuel vapor from the fuel tank filler neck to atmosphere, and a vacuum-relief valve coupled to the closure base separately from the pressure-relief valve and configured normally to dissipate vacuum in the fuel tank filler neck by admitting atmosphere into the tank, a handle adapted to be gripped by a user and rotated about a vertical axis of rotation relative to the filler tank fuel neck, a closure mover coupled to the handle and the filler-neck closure and configured to transmit torque applied to the handle to the filler-neck closure, and a valve mover coupled to the handle to provide means for opening the vacuum-relief valve in response to rotation of the handle in a counterclockwise cap-removal direction by a user during an initial stage of removal of the fuel cap from the fuel tank filler neck so that pressurized fuel vapor in the fuel tank filler neck is vented to the atmosphere through the opened vacuum-relief valve prior to breaking a sealed connection between the filler-neck closure and the fuel tank filler neck.

14. The fuel cap of claim 13, wherein the vacuum-relief valve is positioned in the closure base to lie laterally alongside the pressure-relief valve and in spaced-part relation to the vertical axis of rotation and the valve mover is configured to convert rotary movement of the handle into downward movement of the vacuum-relief valve relative to the closure base, to cause the vacuum-relief valve to move from a normally closed position to an opened position and act as a pressure-relief valve to vent pressurized fuel vapor from the fuel tank to the atmosphere during removal of the fuel cap from the filler neck but before separation of the filler-neck closure from the filler neck.

15. The fuel cap of claim 13, wherein the closure mover is configured to provide means for rotating the filler-neck closure about the axis of rotation relative to the filler neck after the vacuum-relief valve has been moved to the opened position by the valve mover during a final stage of removal of the fuel cap from the fuel tank filler neck.

16. The fuel cap of claim 13, wherein the vacuum-relief valve is located in a right-side upstanding sleeve included in the closure base, the pressure-relief valve is included in a left-side upstanding sleeve included in the closure base, the valve mover including a central plunger, a plunger pusher surrounding the central plunger, and a motion-control arm coupled to a lower portion of the plunger pusher, a torque-transmission ring included in the closure mover, and a handle including a drive lug providing means for engaging and turning the torque-transmission ring and a plunger lug providing means for engaging and turning the plunger pusher relative to the plunger to cause the plunger pusher and plunger to move downwardly as a unit so that the plunger engages and moves the vacuum-relief valve to the opened position, and the torque-transmission ring is configured to provide means for rotating the filler-neck closure about the axis of rotation relative to the fuel tank filler neck after the vacuum-relief valve has been moved by the plunger to the opened position.

17. The fuel cap of claim 16, wherein the drive lug of the handle is mounted for movement in a lost-motion slot formed in the torque-transmission ring and rotation of the handle in the counterclockwise cap-removal direction will cause the drive lug to move through the lost-motion slot formed in the torque-transmission ring transferring rotational motion to the torque-transmission ring until after the valve mover has moved the plunger to cause the vacuum-relief valve to move to the opened position.

* * * * *